May 25, 1943.　　　　L. J. ROSSET　　　　2,320,304
ROASTER
Filed April 6, 1942　　　　2 Sheets-Sheet 1

Louis J. Rosset
INVENTOR.
BY

May 25, 1943. L. J. ROSSET 2,320,304
ROASTER
Filed April 6, 1942   2 Sheets-Sheet 2
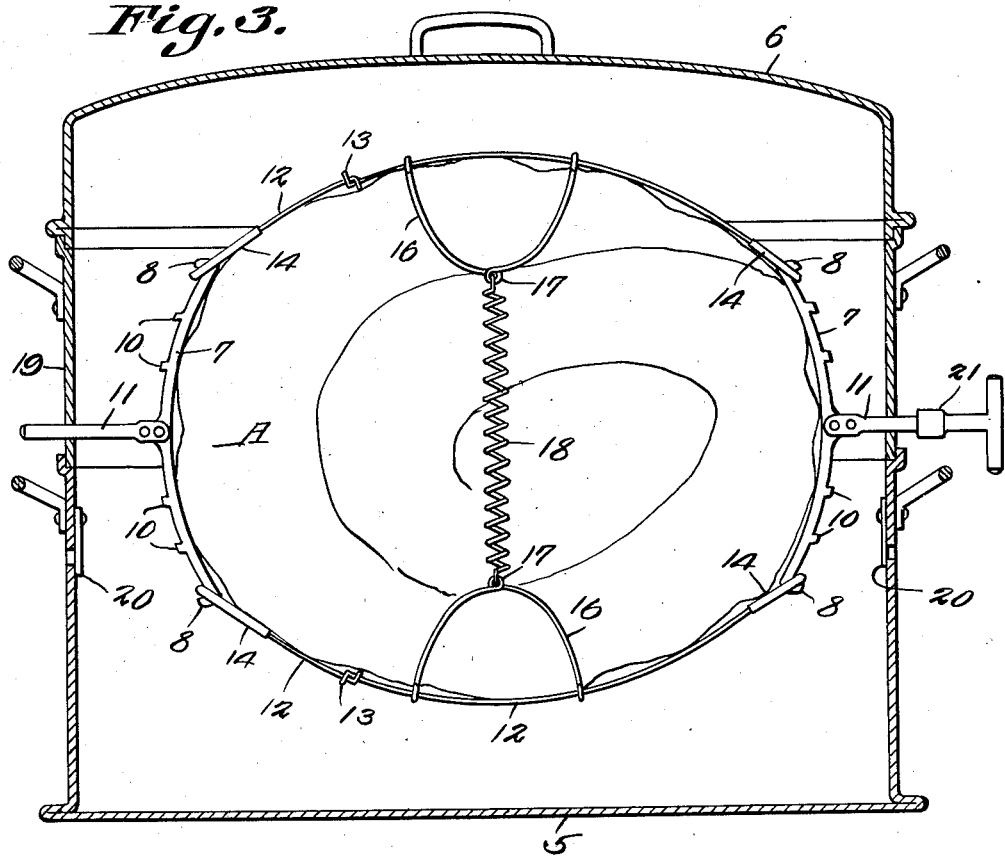
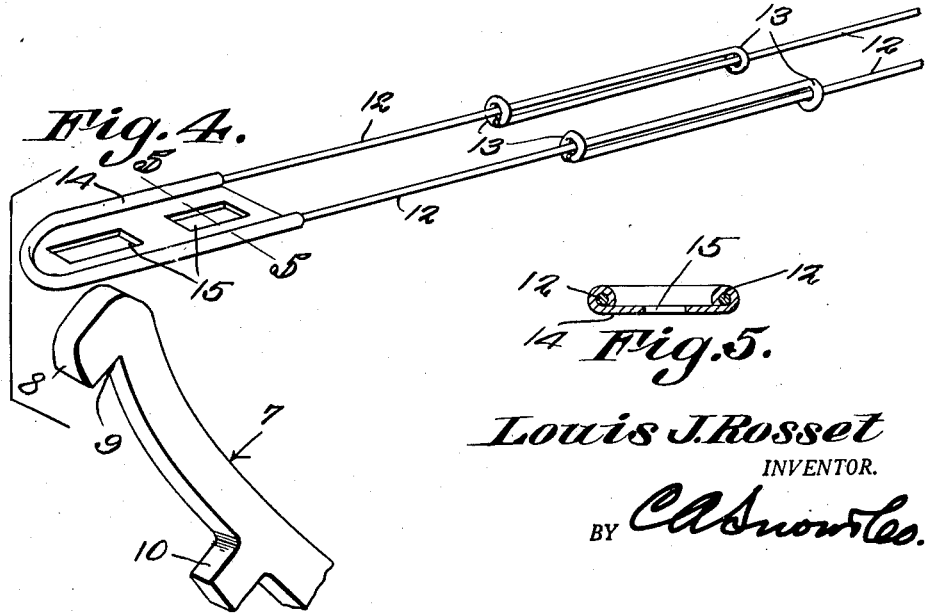
Louis J. Rosset
INVENTOR.
BY C. A. Snow & Co.

Patented May 25, 1943

2,320,304

UNITED STATES PATENT OFFICE 2,320,304

ROASTER

Louis J. Rosset, Burbank, Calif.

Application April 6, 1942, Serial No. 437,900

8 Claims. (Cl. 53—5)

This invention relates to roasters, and more particularly to that type of roaster known as "rotisseries."

An important object of the invention is to provide a roaster of this character having means for clamping and holding the roast or cut of beef being cooked, against displacement, while the roast or beef is being rotated, during the roasting thereof.

Another object of the invention is to provide an adjustable clamp for clamping the roast, to the end that roasts and cuts of beef of various sizes, may be cooked in the device.

Still another object of the invention is to provide a roasting pan which may be adjusted to various depths, thereby adapting the pan for use in roasting cuts of beef of various sizes and shapes.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In said drawings

Figure 3 is a vertical sectional view through a modified form of roasting pan.

Figure 4 is a view illustrating the connection between the end members and the sides of the roast support.

Figure 5 is a sectional view taken on line 5—5 of Figure 4.

Figure 1:
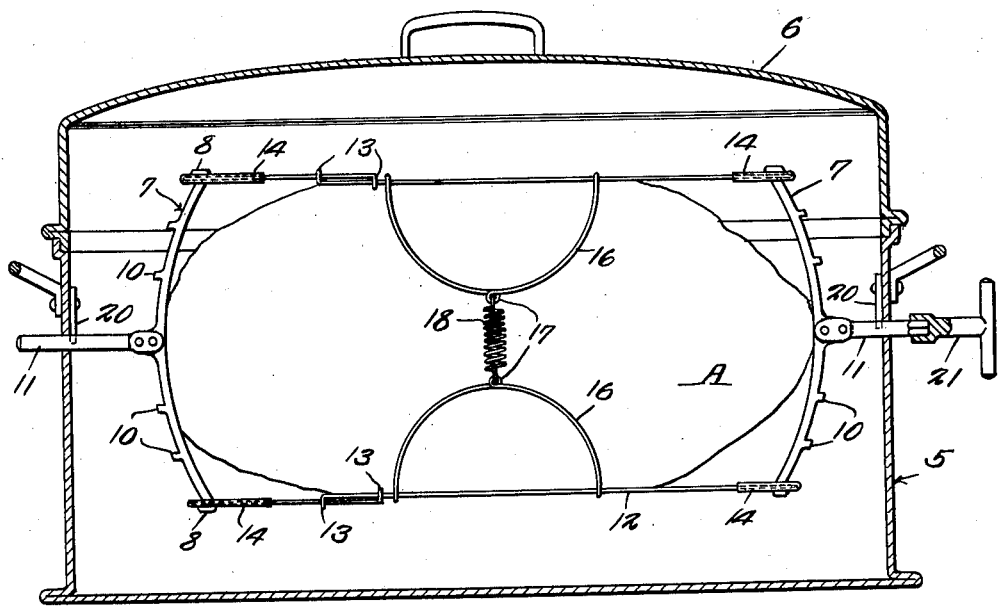
Figure 1 is a vertical sectional view through a roasting pan, equipped with a rotary support, constructed in accordance with the invention.
Figure 2:
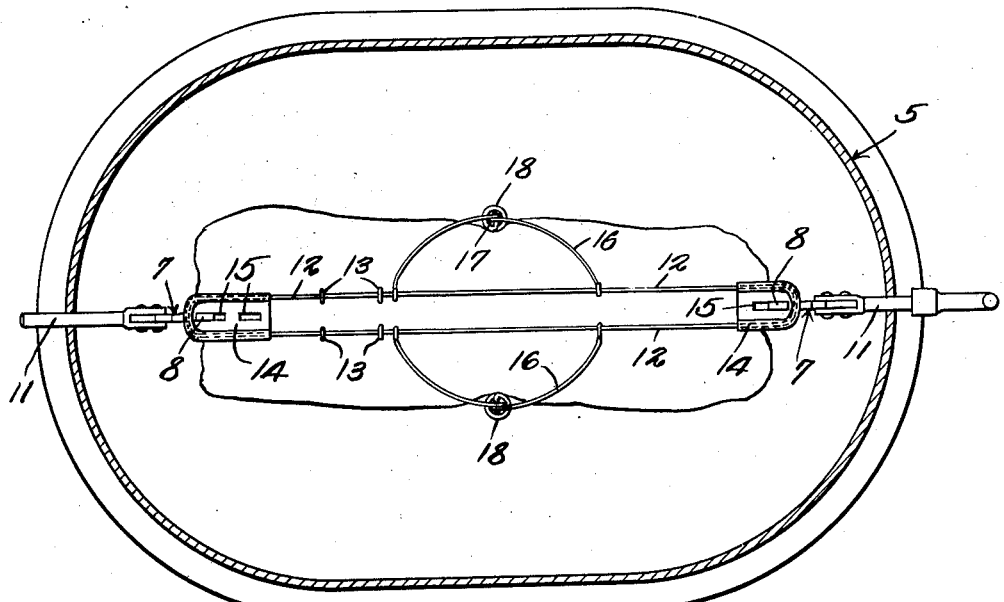
Figure 2 is a transverse sectional view through the pan, illustrating the roast support, in plan.

Referring to the drawings in detail, the roasting pan is indicated generally by the reference character 5, the cover of the pan being indicated by the reference character 6.

The pan is provided with openings disposed in the opposite ends thereof through which the shafts of the rotary support extend, providing bearing openings for the shafts.

The support by means of which the roast or cut of beef to be cooked, is supported, comprises end members 7 formed with heads 8 at their ends, the heads defining shoulders 9. Formed on the outer surfaces of the end members 7, and inclined toward the centers thereof, are lugs 10 which are arranged in spaced relation with respect to each other, for purposes to be hereinafter more fully described. The shafts on which the end members are supported, are indicated at 11 and have bifurcated inner ends that straddle the central portions of the end bars 7, where they are rigidly secured to the end bars. These shafts are of lengths so that they will extend beyond the walls of the pan, as clearly shown by the drawings.

The support also includes adjustable side members which embody heavy yieldable wire members 12 which are bent intermediate their ends, providing spaced legs. At the ends of the wire members 12 are formed eyes 13, the eyes of one member, accommodating the legs of the adjacent member, so that the members may slide with respect to each other, and when curved, will set up a binding action, to hold the side members in their positions of adjustment.

The wire members 12 are held in their proper shape, by means of the end plates 14 which have their marginal edges bent around the wire members 12, securing the end plates in position. Elongated openings 15 are formed in the end plates so that the end plates may be positioned over the heads 8 to engage the shoulders 9 of the end members 7, thereby securing the side members of the support, to the end members.

Connecting the side members of the support, at opposite sides thereof, are substantially U-shaped wire members 16 which have their free ends looped around the wires 12 as shown by the drawings.

Each of these members 16 is formed with an eye 17 through which the ends of the coiled springs 18 extend, the coiled springs 18 acting to draw the wire members 16 towards each other, and hold the side sections of the support into close engagement with the roast or cut of beef being cooked, the cut of beef in the present showing being indicated by the reference character A.

From the foregoing it will be seen that due to the construction shown and described, roasts or cuts of beef of various sizes may be securely gripped by the support to hold the roast or cut of beef, against displacement when the device is being rotated.

In order that the device may be used in roasting substantially large cuts of beef, an extension band indicated at 19 is provided, which band is constructed to rest on the usual cover flange of the pan, as shown by Figure 3 of the drawings. When the extension band 19 is used, the cover 6 is positioned directly thereon. Openings are provided in the band 19 for the reception of the shafts 11 so that the band provides the bearing openings for the rotatable support. When the band 19 is used, the covers 20 are moved over the bearing openings of the main portion of the pan, to prevent the escape of steam at this point.

One of the shafts 11 is constructed to receive the key 21 which, when positioned thereon, may be used as a means for rotating the support and cut of beef held therein so that the entire outer surface of the cut of beef may be exposed to the heat to insure even roasting.

Under ordinary conditions, when a small roast or cut of beef is to be cooked, the pan and rotary support are used as shown by Figure 1 of the drawings. Should it be desired to cook an exceptionally large cut of beef, it may be found necessary to use the extension band 19 to provide the necessary clearance between the cut of beef and cover as the support is rotated.

It might be further stated, that due to the construction of the support, the cut of beef is firmly gripped and held within the support regardless of the size of the cut of beef.

What is claimed is:

1. A roaster comprising a roasting pan, a rotary meat support mounted within the pan, said meat support embodying curved end members, spaced lugs formed on the outer surfaces of the end members, side members forming a part of the support, each of the side members including longitudinally adjustable sections adapted to cooperate with the end members in adjustably securing the side members and end members together, and yieldable members connecting the side members and adapted to draw the side members toward each other, gripping a roast positioned within the support.

2. A roaster comprising a roasting pan, a rotary meat support mounted within the pan, said meat support embodying curved end members, side members, means for adjustably connecting the side members to the end members whereby the distance between the side members may be regulated, yieldable members connecting the side members and adapted to draw the side members into close engagement with a roast supported between the end members, and shafts on the end members, adapted to extend through bearing openings in the pan, whereby the meat support is mounted within the pan.

3. A roaster comprising a roasting pan, a rotary meat support mounted within the pan, said meat support embodying end members and side members, means for adjustably connecting the side members to the end members whereby the distance between the side members may be regulated, and yieldable members connecting the side members and adapted to draw the side members toward each other in gripping a roast held within the support.

4. A roaster comprising a roasting pan, a meat support mounted for rotary movement within the pan, said meat support embodying end members, shafts extending from the end members and adapted to be positioned in bearing openings in the pan, supporting the end members, side members connected with the end members, each of said side members comprising sections adjustable longitudinally with respect to each other, and yieldable members connected with the side members at points intermediate their ends, for drawing the side members toward each other.

5. A roaster comprising a roasting pan, a rotary meat support mounted within the pan, said meat support embodying curved end members, shafts extending from the end members and adapted to be extended through bearing openings in the pan for rotatably mounting the meat support, lugs extending from the end members, side members forming a part of the meat support, each of the side members including a pair of sections adjustable longitudinally with respect to each other, plates at the ends of the side members, said plates having openings adapted to accommodate the end bars, the walls of the openings cooperating with the lugs in securing the side members in adjusted positions throughout the length of the end bars, and yieldable members connected with the side members and adapted to draw the side members into close engagement with a roast positioned within the support.

6. A roaster comprising a roasting pan, a rotary meat support mounted within the pan, said meat support embodying end members, shafts extending from the end members and adapted to be positioned in bearing openings of the pan, whereby the meat support is rotatably mounted within the pan, side members connecting the end members, each of said side members embodying a pair of sections, each section comprising a length of wire material bent intermediate its ends and formed with eyes at its free ends, the eyes of one section adapted to accommodate the wire of the adjacent section, adjustably connecting the sections, plates formed at the ends of the sections and having openings adapted to accommodate the end members, connecting the side members and end members of the meat support, and yieldable members connected with the side members of the support, for drawing the side members into close engagement with a cut of beef positioned within the support.

7. A roaster comprising a roasting pan, a rotary meat support mounted within the pan, said meat support embodying curved end members, shafts extending from the end members and adapted to be positioned in bearing openings of the pan, rotatably mounting the support within the pan, adjustable side members forming a part of the support and being connected with the end members, yieldable means connecting the side members, said yieldable means embodying wire end members connected with the side members, and coiled springs connected with the wire members and adapted to draw the wire members together.

8. A roaster comprising a roasting pan, a rotary meat support mounted within the pan, said meat support embodying end members, shafts extending from the end members and adapted to be positioned in bearing openings of the pan, whereby the meat support is rotatably mounted within the pan, side members forming a part of the meat support and embodying sections adjustable longitudinally with respect to each other, end plates mounted at the outer ends of the sections, said end plates having openings through which the ends of the end members extend, adjustably connecting the end members and side members, and yieldable members connecting the side members and adapted to draw the side members into close engagement with a roast held within the support.

LOUIS J. ROSSET.